(12) United States Patent
Funk et al.

(10) Patent No.: US 8,978,516 B2
(45) Date of Patent: Mar. 17, 2015

(54) HYBRID DRIVE

(71) Applicant: Bayerische Motoren Werke Aktiengesellschaft, Munich (DE)

(72) Inventors: Kilian Funk, Greer (DE); Dirk Schlichte, Munich (DE); Martin Förg, Garching (DE); Nico Daun, Munich (DE); Alexander-Wilhelm Otte, Egenhofen (DE); Matthias Urbanek, Stuhr (DE); Bernhard Hoess, Munich (DE); Lutz Neumann, Neufahrn (DE)

(73) Assignee: Bayerische Motoren Werke Aktiegesellschaft, Munich (DE)

( * ) Notice: Subject to any disclaimer, the term of this patent is extended or adjusted under 35 U.S.C. 154(b) by 0 days.

(21) Appl. No.: 13/918,327

(22) Filed: Jun. 14, 2013

(65) Prior Publication Data

US 2013/0296099 A1    Nov. 7, 2013

Related U.S. Application Data

(63) Continuation of application No. PCT/EP2011/005843, filed on Nov. 19, 2011.

(30) Foreign Application Priority Data

Dec. 15, 2010    (DE) .......................... 10 2010 063 092

(51) Int. Cl.
*F16H 37/06*    (2006.01)
*B60W 20/00*    (2006.01)
(Continued)

(52) U.S. Cl.
CPC ................. *B60W 20/10* (2013.01); *B60K 6/36* (2013.01); *B60K 6/48* (2013.01); *B60K 6/547* (2013.01); *B60K 2006/4808* (2013.01); *B60K 2006/4841* (2013.01); *F16H 3/006* (2013.01); *Y02T 10/6221* (2013.01); *Y02T 10/626* (2013.01); *Y10S 903/902* (2013.01)
USPC ......................................... 74/665 A; 903/902

(58) Field of Classification Search
None
See application file for complete search history.

(56) References Cited

U.S. PATENT DOCUMENTS 6,634,247 B2    10/2003    Pels et al.
7,166,059 B2    1/2007    Reitz et al.
(Continued)

FOREIGN PATENT DOCUMENTS

DE    44 31 929 C1    10/1995
DE    199 60 621 A1    6/2001
(Continued)

OTHER PUBLICATIONS

German Search Report dated Jul. 2, 2012 including partial English-language translation (Six (6) pages).

*Primary Examiner* — Robert A Siconolfi
*Assistant Examiner* — Huan Le
(74) *Attorney, Agent, or Firm* — Crowell & Moring LLP

(57) ABSTRACT

The invention relates to a hybrid drive, comprising an internal combustion engine, an electric machine and a torque superposition device, by means of which a torque supplied by the internal combustion engine can be superposed on a torque supplied by the electric machine, wherein the torque superposition device has a first and a second torque input and a torque output. The electric machine is coupled to the first torque input via a first transmission device, and the internal combustion engine is coupled to the second torque input via a second transmission device.

16 Claims, 3 Drawing Sheets

(51) Int. Cl.
*B60K 6/36* (2007.10)
*B60K 6/48* (2007.10)
*B60K 6/547* (2007.10)
*F16H 3/00* (2006.01)

(56) References Cited

U.S. PATENT DOCUMENTS

2010/0311540 A1* 12/2010 Hellenbroich .................... 477/5
2011/0190084 A1* 8/2011 Zerbato et al. ................... 475/5

2011/0239820 A1 10/2011 Shibahata

FOREIGN PATENT DOCUMENTS

| | | |
|---|---|---|
| DE | 101 33 695 A1 | 3/2002 |
| DE | 102 03 514 A1 | 8/2003 |
| DE | 10 2005 002 591 A1 | 8/2005 |
| DE | 10 2006 041 150 A1 | 9/2008 |
| DE | 10 2009 018 885 A1 | 10/2010 |
| EP | 2 368 739 A1 | 9/2011 |

* cited by examiner

HYBRID DRIVE

CROSS-REFERENCE TO RELATED APPLICATIONS

This application is a continuation of PCT International Application No. PCT/EP2011/005843, filed Nov. 19, 2011, which claims priority under 35 U.S.C. §119 from German Patent Application No. 10 2010 063 092.6, filed Dec. 15, 2010, the entire disclosures of which are expressly incorporated herein by reference.

BACKGROUND AND SUMMARY OF THE INVENTION

The present invention relates to a hybrid drive according to the characteristics of Claim 1.

In the case of many hybrid concepts known from the state of the art, the crankshaft of an internal-combustion engine is connected by way of a first clutch with the rotor of an electric machine and by way of a second clutch with the input shaft of a stepped automatic transmission. In the "parallel operating mode", i.e. when the vehicle is driven simultaneously by the internal-combustion engine as well as by the electric machine, the internal-combustion engine and the electric machine thereby rotate at the same rotational speed or, if they are coupled with one another by way of a "transmission ratio", corresponding to a predefined rotational-speed ratio, which is not always optimal with respect to power.

It is an object of the invention to create a novel hybrid drive concept which better takes into account the above-described disadvantages of conventional hybrid drive concepts.

This object is achieved by means of the characteristics of Claim 1. Advantageous embodiments and further developments of the invention are contained in the subclaims.

The starting point of the invention is a hybrid drive having a first driving machine, which may be formed by an electric machine, and a second driving machine, which may be formed by an internal-combustion engine. The two driving machines are mutually coupled by way of a "torque superposition device". The term "torque superposition device" should be interpreted very broadly. The general meaning is that the driving power of the two driving machines or the corresponding drive torques can be "interconnected", i.e. can be superposed, for example, by means of a summation transmission. Correspondingly, the torque superposition device has a first torque input, which is assigned to the first driving machine, and a second torque input, which is assigned to the second driving machine, as well as a torque output, by way of which the "interconnected" torque can be transmitted to driving wheels of a vehicle.

In the following, the term "electric machine" or "e-motor" will be used for the first driving machine, and the term "internal-combustion engine" will be used for the second driving machine, the above not being understood to be limiting.

The essence of the invention consists of the fact that the electric machine is coupled or can be coupled by way of the first torque input with a "first transmission device", and the internal-combustion engine is coupled or can be coupled by way of the second torque input with a "second transmission device" of the torque superposition device, and the transmission devices are each coupled, i.e. kinematically connected, on the output side with the torque output. At least one, preferably both transmission devices have at least two alternatively selectable transmissions or transmission positions. Basically, various constructions can be used for the transmission devices, such as shiftable spur gearwheel positions, shiftable planetary transmissions, shiftable belt or chain drives, etc., or also infinitely variable transmission devices.

By means of the hybrid drive according to the invention, the two "power branches" can be shifted independently of one another. Within the scope of the available gears, the rotational speeds of the internal-combustion engine and of the electric machine can be selected independently of one another. During the shifting, the power branch not affected by the shifting supports by means of its full power the tractive force at the torque output of the torque superposition device. In this case, the power branch affected by the shifting or the corresponding drive assembly (electric machine or internal-combustion engine) can be used for the "external synchronization" of the shifting.

In other words, in contrast to conventional parallel hybrid concepts, this results in the advantage that the electric machine and the internal-combustion engine in the parallel hybrid operation do not always have to rotate at a certain, fixedly predefined rotational speed ratio but that at least one of the two driving machines can be "shifted into another gear", which is advantageous not only with respect to consumption aspects but provides the drive with better dynamics.

According to a further development of the invention, the second transmission device assigned to the internal-combustion engine has at least two and no more than four, preferably exactly three alternatively selectable transmission positions.

In this case, the at least two transmission positions of the second transmission device are to be designed such that one transmission position is constructed as a driving gear suitable for maximum speed, and a further transmission position is constructed as an efficiency gear. By means of the driving gear suitable for maximum speed, the maximum speed of the vehicle can be driven. In contrast, the efficiency gear is designed to be longer than the driving gear suitable for the maximum speed and thereby permits an efficiency-optimized operation of the internal-combustion engine in the medium or higher speed range, for example, on an express way or on the turnpike (autobahn).

In the case of a limitation to two transmission positions of the second transmission device designed in this manner, the first transmission device of the electric motor and also the power of the electric motor are to be designed such that the driving operation of the vehicle during the start of the drive and in the lower speed range, i.e. in the city operation, will be represented essentially by the electric motor. Here, the internal-combustion engine, as a rule and if required, carries out an assisting function by providing a base load.

A hybrid drive according to the invention that is limited to two transmission positions of the second transmission device is suitable for highly electrified drives with a fairly high electric power; i.e. the peak power of the electric motor should not be less than 30%, preferably at least 50%, even better at 80% and ideally at least 100% of the nominal power of the internal-combustion engine. The continuous power of the electric motor may in each case be approximately at a ratio of one-half below the peak power customary for electric motors.

The more balanced the power situation between the peak power of the electric motor and the nominal power of the internal-combustion engine, the better the electric motor will be able to cover the dynamic load demand, particularly during acceleration operations. Especially in the case of gear changes, the drive assemblies can also assist one another, which results in very comfortable shifting operations without or with only a slight breakdown of the tractive force during the shifting.

It is especially advantageous for the power ratio between the continuous power of the electric motor and the nominal power of the internal-combustion engine to be approximately balanced or to exceed the nominal power of the internal-combustion engine; i.e. the continuous power of the electric motor is approximately 80% of the nominal power of the internal-combustion engine or more. In this case, the electric motor can also generate the propulsion power in those driving situations in which the driving gear of the internal-combustion engine cannot yet be operated or can be operated only at low power—thus, in the case of a torque superposition device constructed according to the invention with, for example, only two internal-combustion engine gears designed as indicated above, when starting to drive and in the lowest speed range up to approximately 30 km/h–, and therefore can constitute the driving function purely or predominantly by means of the electric motor, without limiting the driving power.

If the peak power of the electric motor were lower than the above-specified minimum power demand, the electric motor could no longer constitute an adequate driving function but, if required, could still "assist" the driving mode of the internal-combustion engine. As a result, the reduction according to the invention of the currently customary six or more internal-combustion engine gears to a few gears with the above-mentioned advantages of the invention could no longer be represented.

As a result of the small number of transmission positions of the second transmission device, the component-side expenditures are low while particularly the space requirements are also low.

According to a further development of the invention, it may, however, also be advantageous to construct a further transmission position of the second transmission device as a starting gear. In this case, a starting element, such as a starting clutch, could be integrated in the hybrid drive. The starting gear can simultaneously be used as a hill gear in the lower speed range and ensure that a driving operation by the internal-combustion engine is feasible also in situations in which the energy content of the electric storage system of the vehicle cannot provide sufficient energy for a driving operation.

Particularly in the case of comparatively low electric motor powers according to the above-indicated preferred ranges, it may make sense with respect to dynamics to provide a still further, fourth, transmission position of the second transmission device, which, on the transmission side, is arranged as a further driving gear but is not suitable for maximum speeds, between the starting gear and the driving gear suitable for maximum speeds. This fourth transmission position will be used particularly when an acceleration takes place that originates from the lower speed range.

Although the first transmission device may be implemented with a single non-shiftable transmission position or even in a direct manner (transmission ratio 1:1), it is particularly advantageous for also the first transmission device to be implemented with at least two alternatively selectable transmission positions.

The transmission position with the "longer" design should preferably be designed as a gear of the vehicle that is suitable for maximum speeds. This has the advantage that the transmission position with the shorter design can be used as a dynamics gear with an excellent torque provision that is typical of e-motors, whereas the transmission with the transmission position with the longer design makes it possible to leave the e-motor in a coupled state also in the high speed range to the maximum speed range of the vehicle and to thereby utilize it for the braking energy recovery as well as for boosting.

According to a further development of the invention, the hybrid drive has precisely a single electric machine provided for generating the propulsion of the vehicle, which permits a comparatively simple, compact and cost-effective construction. This naturally also comprises those solutions in which an additional electric machine is integrated in the overall system, this electric machine then not being used for generating propulsion.

According to an advantageous further development of the invention, the torque output of the torque superposition device is constructed as an output shaft with an output gear position, the output gear position preferably being connected directly with the differential of the driven vehicle axle of the motor vehicle.

For selecting the individual transmission positions of the transmission devices, form-locking or frictionally engaged "shifting elements" can be provided. Gearshift sleeves, for example, may be provided in the case of spur gearwheel positions. In order to improve the shifting comfort, one synchronizing device respectively may be assigned to one of the form-locking shifting elements or to all form-locking shifting elements. Since an "external" pre-synchronization by means of the internal-combustion engine or by the electric machine is already conceivable, simpler cost-effective shifting elements may also be used, such as sliding sleeves with jaw clutches without synchronizing units, as known, for example, from motorcycle transmissions. An "external synchronization" can be implemented by a corresponding rotational speed control of the internal-combustion engine or of the electric machine.

When planetary transmissions are used as transmission devices, particularly the use of friction clutches or friction brakes may be considered. However, in principle, frictionally engaged shifting elements could also be used in the case of shiftable spur gearwheel positions.

An uncoupling of the electric machine or of the internal-combustion engine from the torque superposition device can very easily take place in that the corresponding shifting element or elements is(are) shifted into a "neutral position". A "neutral position" is a position in which no torque transmission is possible from the electric machine or from the internal-combustion engine to the torque superposition device. As a result, a purely electric traveling drive is permitted as well as an uncoupling of the internal-combustion engine for reducing drag torques or a drive purely by the internal-combustion engine, in which case, the electric machine is uncoupled.

In summary, particularly the following advantages are achieved by means of the invention:

The independent shiftability of the two power branches permits a mutual tractive power assist. This increases the comfort compared to conventional hybrid concepts, in which an engaged transmission gear is always "impressed" on both power branches.

The hybrid concept according to the invention permits a free scalability of the drive assemblies and is therefore suitable not only for conventional hybrid concepts but especially also for so-called plug-in hybrid concepts.

The independent selection of the operating points for the internal-combustion engine and the electric machine opens up high potentials for reducing the consumption and emission, for improving the drive acoustics as well as for increasing the driving performances.

By means of the "summation function" of the torque superposition device, the internal-combustion engine and the electric machine can be optimally supplemented in the operation. This results in savings and efficiency potentials, which, in turn, permits "making" the two drive assemblies "less demanding". "Making less demanding" means that, in contrast to conventional hybrid concepts, the electric machine no longer has to meet the highest efficiency demands over the entire rotational speed range.

By means of the hybrid drive according to the invention, a mixed operation, i.e. both drive assemblies are engaged and, as a function of the driving situation, supply positive (driving) torque or negative torque (applies only to the e-motor in the operation as a generator), or also a purely electric operation in the sense of an e-driving function, can be selectively exhibited in the driving operation.

In the following, the invention will be explained in detail by means of the drawings.

DETAILED DESCRIPTION OF THE DRAWINGS

Figure 1:
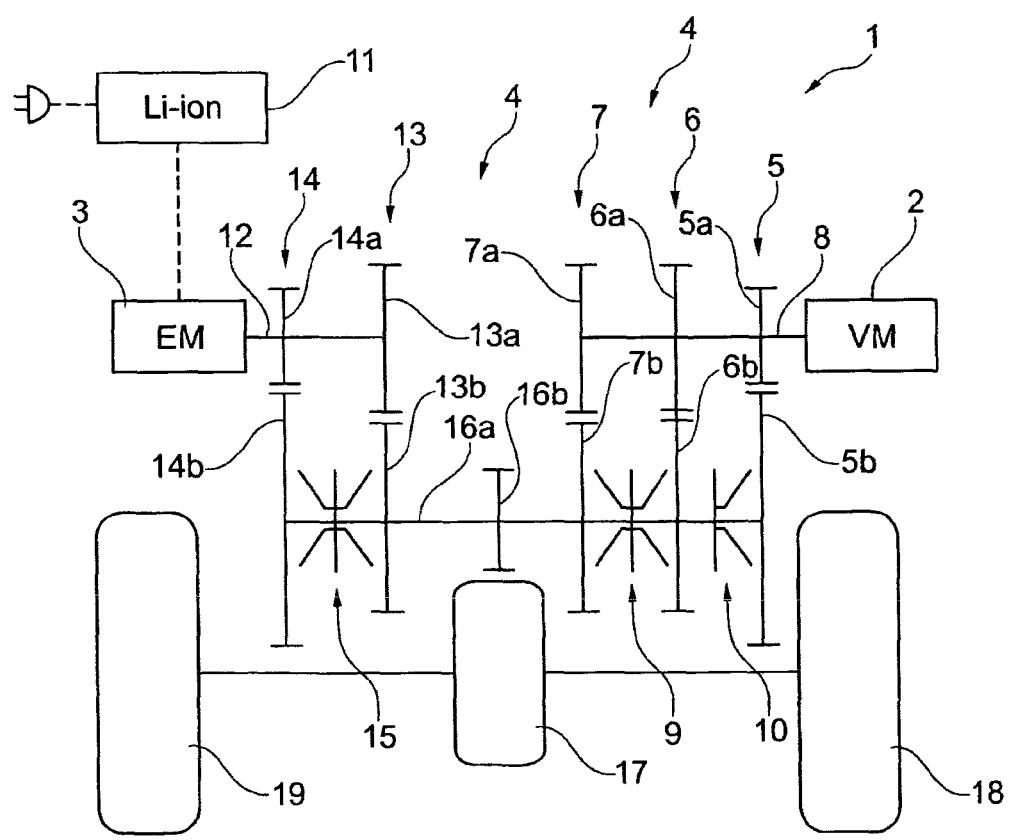
FIG. 1 is a schematic view of the basic principle of the invention.

FIG. 1 illustrates a basic principle of a hybrid drive 1 constructed according to the invention, which has an internal-combustion engine 2, an electric machine 3 and a torque superposition device 4. Housings of the components, the actuator system, oil supplies for lubricating bearings and the like are not shown in FIG. 1.

The torque superposition device 4 in FIG. 1 constructed as a summation transmission has a first torque input 12, a second torque input 8, a torque output 16a and 16b as well as a first transmission device, which comprises two transmission positions 13 and 14, and a second transmission device, which comprises three transmission positions 5, 6 and 7. Here, the torque inputs 8 and 12 are each constructed as input shafts. The rotor shaft of the electric machine 3 is coupled with the first torque input 12 of the torque superposition device 4, and the crankshaft of the internal-combustion engine 2 is coupled with the second torque input 8 of the torque superposition device 4 in each case by means of shaft connections which are not shown. The first torque input 12 is connected with the first transmission device, and the second torque input 8 is connected with the second transmission device, this connection consisting here only of a continuation of the respective input shaft 8 and 12 and a mounting of the respective fixed wheels of the spur gearwheel set pairings 5a and 5b, 6a and 6b familiar to a person skilled in the art, which form the respective transmission positions 5, 6, 7, 13, 14, on the input shafts 8 and 12.

On the output side, the idlers 5b, 6b, 7b, 13b, 14 of the transmission positions 5, 6, 7, 13, 14 are arranged on the output shaft 16a. For generating a non-rotatable operative connection between the idlers 5b, 6b, 7b, 13b, 14b and the output shaft 16a, shift dogs 9, 10 and 15 are arranged in the skeleton diagram illustrated in FIG. 1. The operating principle and alternative embodiments of such shift dogs are known to the person skilled in the art.

Together with the output spur gearwheel 16b non-rotatably mounted on the output shaft 16a, the output shaft 16a forms the torque output of the torque superposition device 4.

In the vehicle arrangement illustrated here, the output spur gearwheel 16b engages with an output differential 17 which, again, in an arrangement known to the person skilled in the art, by way of output shafts, is in an operative connection with the driven wheels 18 and 19.

Here, the internal-combustion engine 2 can be coupled with the output shaft 16a by the second transmission device, which is constructed as an "internal-combustion engine sub-transmission" and which is formed by the three gear positions 5, 6, 7. Each of the gear positions 5, 6, 7 has a gearwheel 5a, 6a, 7a non-rotatably connected with the crankshaft of the internal-combustion engine 2. The gearwheels 5a, 6a, 7a mesh with assigned gearwheels 5b, 6b, 7b, which are each rotatably arranged on the output shaft 16a.

For shifting the "three gears" of the internal-combustion engine sub-transmission, a double shifting element 9 and a single shifting element 10 are provided here. One synchronizing device respectively, which is not shown here, may be assigned to each of the shifting elements for each of the gears. By way of the internal-combustion engine sub-transmission, torque or driving power can be transmitted from the crankshaft 8 of the internal-combustion engine 2 to the output shaft 16a of the torque superposition device 4 and from there by way of the output spur gearwheel 16b to the output differential 17.

The electric machine 3 is electrically connected with an electric energy accumulator, for example, a lithium ion battery 11. When the electric machine 3 operates as a motor, the latter is fed with electric energy by means of the battery 11. When the electric machine 3 operates as a generator, the power produced by the generating mode is fed into the battery 11.

The electric machine 3 has a rotor shaft which is connected with the first torque input by way of a flanged joint not shown in FIG. 1. The first torque input, like also the above-mentioned second torque input 9, is constructed here as the input shaft 12. The rotor shaft can be coupled with the output shaft 16a by way of two shiftable gear positions, which form a quasi "sub-transmission of the electric machine". The gear positions 13, 14 each have a gearwheel, 13a and 14 respectively, which are each non-rotatably arranged on the input shaft 12 and which each mesh with an assigned gearwheel 13b, 14b, which are rotatably arranged on the output shaft 16a. A double shifting element 15 is assigned to the two rotatably arranged gearwheels 13b, 14b, by way of which double shifting element 15, the electric machine 3 can be rotatably coupled optionally by way of the gear position 13 or by way of the gear position 14 with the output shaft 16a.

The gearwheel 16b non-rotatably arranged on the output shaft 16a forms the "torque output" of the torque superposition device 4. The gearwheel 16b meshes with a driving gear of a differential transmission 17 not shown in detail, which feeds the driving power generated by the internal-combustion engine 2 and the electric machine 3 into driving wheels 18, 19 of a vehicle not shown here in detail.

The transmission ratios of the transmission positions 5, 6, 7 constructed here as gearwheel pairings, thus the shiftable gears of the internal-combustion engine, are selected here such that the first gear (=transmission position 5) can be used as the starting gear or as a hill gear at low speeds of up to approximately 40 km/h; the second gear (=transmission position 6) is designed as a driving gear provided that it can represent a stable maximum speed; and the third gear (=transmission position 7) is designed as an efficiency gear with a longer design than the driving gear.

The transmission ratios of the transmission positions 13, 14 constructed as gearwheel pairings, thus, the shiftable gears of the electric motor, are selected such in this case that the first gear (=transmission position 14) is designed as a dynamics gear with a short transmission, and the second gear (=transmission position 13) is designed as a gear suitable for maximum speed.

On the power side, the driving assemblies are designed in such a manner here that, by means of the nominal power of the internal-combustion engine, a stable maximum speed can be exhibited. In the case of typical small cars with an empty weight of approximately 1,200 kilograms and a maximum speed greater than 160 km/h, this results in a minimum power of the internal-combustion engine of approximately 50 kW.

When the nominal power of the internal-combustion engine is selected to be low (in the case described here, at approximately 50 kW), the continuous power of the electric motor should be in the range of the nominal power of the internal-combustion engine.

However, when the nominal power of the internal-combustion engine is selected to be greater, it will be sufficient to choose the peak power of the electric motor approximately corresponding to the nominal power of the internal-combustion engine. The peak power of the electric motor is the power which an electric motor can supply for a short time, normally for approximately 10 seconds. The peak power is typically approximately twice as high as the continuous power of the electric motor.

By means of the hybrid drive 1 constructed according to the invention and illustrated in FIG. 1, it is basically possible to generate the propulsion torque required for the propulsion of the vehicle purely by means of the internal-combustion engine or purely by means of the electric motor or in the mixed operation, i.e. the two drive assemblies are engaged.

Furthermore, the electric motor can be operated as a motor or as a generator, so that, in addition to a recovery of braking energy, electric energy can also be represented by way of the rise of the load point of the internal-combustion engine.

Compared to solutions for hybrid drives known from prior art, it is an advantage of the invention that the assemblies can be shifted independently of one another; i.e. the assembly operating point of the internal-combustion engine and of the electric motor can be set independently of one another.

Thus, it is, for example, conceivable to operate the internal-combustion engine in its efficiency gear and simultaneously operate the electric motor in its dynamics gear. This ensures that the "base load" required for the propulsion of the vehicle is generated with optimized efficiency by way of the internal-combustion engine, and simultaneously high dynamics are ensured by means of the electric motor by the torque characteristic typical of electric motors, while the transmission of the dynamics gear is short.

Furthermore, as a result of the shiftable second transmission position 13, the electric motor can remain integrated in the drive train even up to the maximum speed of the vehicle, so that, even at very high speeds, propulsion torque can still be generated by the electric motor, or, in the case of a deceleration, braking or deceleration energy can be recovered. In the case of 1-gear solutions known from prior art, either the maximum speed of the vehicle has to be limited here or the electric motor has to be uncoupled.

The electric motor can also be operated in an efficiency-optimized manner as a result of the two transmission positions.

Figure 2:
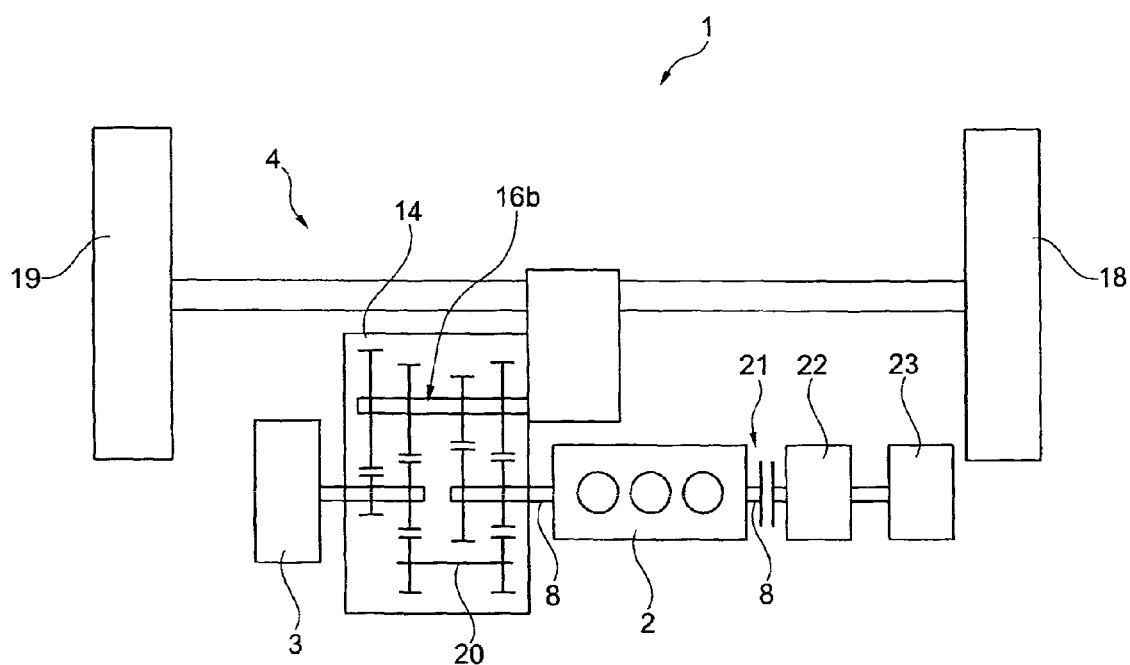
FIG. 2 is a view of the concept illustrated in FIG. 1 with an additional intermediate shaft.

FIG. 2 illustrates a variant of the hybrid concept of FIG. 1. Here, an intermediate shaft 20 is additionally provided which makes it possible to use the transmission position 14 of the electric machine 3 in order to represent a short-geared starting gear of the internal-combustion engine 2. For this purpose, the gearwheel sets of the transmission positions arranged on the output shaft 16*a* are constructed as shiftable idlers as in FIG. 1. This configuration is also used for charging the battery (not shown) in the stationary position by way of the electric machine 3.

As an alternative to the arrangement illustrated in FIG. 2, the electric machine could be coupled to the intermediate shaft 20.

In the embodiment illustrated in FIG. 2, the crankshaft 8 of the internal-combustion engine 2 can furthermore be coupled by way of a clutch 21 with a second electric machine 22, which drives an accessory 23, such as an air-conditioning compressor.

Figure 3:
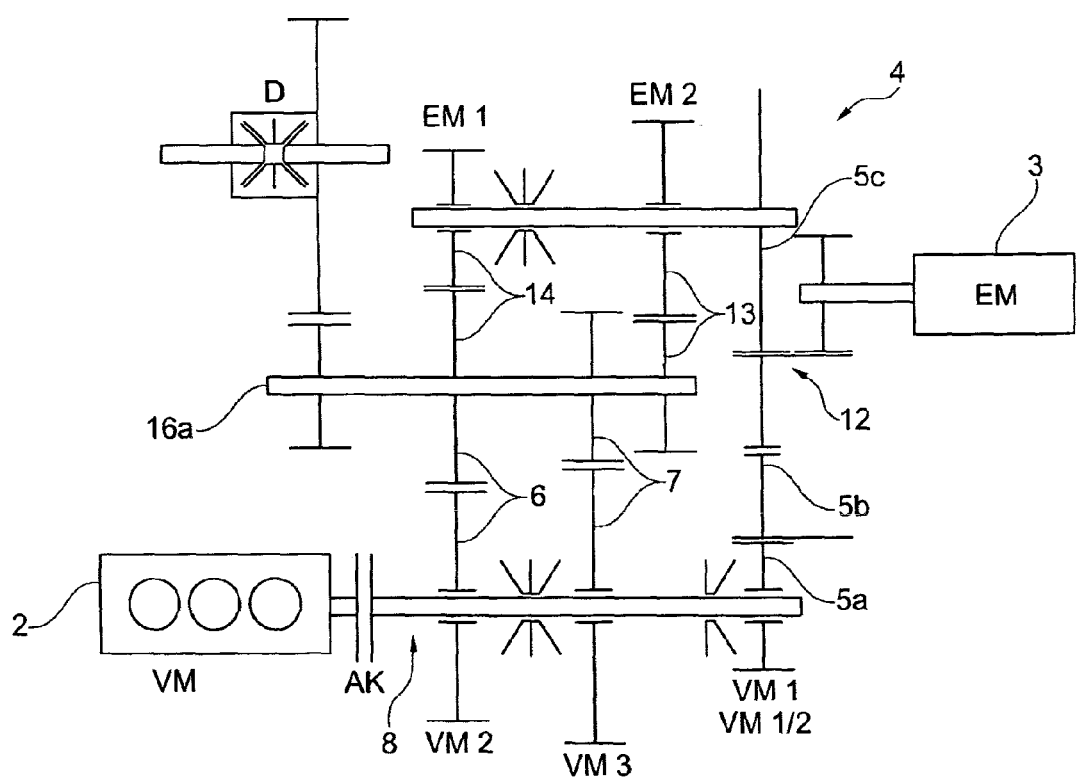
FIG. 3 is a view of a further embodiment of the hybrid drive according to the invention.

FIG. 3 illustrates another embodiment of the invention in a 3-shaft arrangement, the three shafts being arranged axially parallel to one another. The construction and method of operation correspond to the implementations of the above-mentioned embodiments, the first transmission position VM1 of the internal-combustion engine constructed here as a starting and hill gear, being represented by way of a joint use of the electric-motor sub-transmission by way of EM1, and therefore by way of the gearwheels 5*a*, 5*b*, 5*c* and 14.

In addition, a fourth gear VM1/2 can be represented here which, on the transmission side, is arranged between VM1 and VM2, where the joint use of the electric motor sub-transmission takes place by way of EM2, and therefore by way of the gearwheels 5*a*, 5*b*, 5*c* and 13. In these cases with gear selection VM1 or VM1/2, however, the electric motor can no longer be shifted independently of the internal-combustion engine, but, for the gear selection VM1, a gear selection EM1 will also be required; and, for the gear selection VM1/2, the gear selection EM2 will be required.

Stationary charging, i.e. a charging of the electric energy accumulator by means of a generating operation of the electric motor with driving by means of the internal-combustion engine when the vehicle is stationary is possible also in the embodiment of the invention illustrated in FIG. 3.

In addition, FIG. 3 shows a starting clutch AK arranged between the internal-combustion engine and the torque input of the torque superposition device, which starting clutch has the purpose of permitting a starting drive by way of VM1 by means of the internal-combustion engine.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hybrid drive for motor vehicles comprising:
    an internal-combustion engine;
    an electric machine; and
    a torque superposition device by means of which a torque supplied by the internal-combustion engine can be superposed with a torque supplied by the electric machine, the torque superposition device having a first and a second torque input and a torque output, and further comprises a first transmission device and a second transmission device,
    wherein the electric machine can be coupled with the first torque input and the internal-combustion engine can be coupled with the second torque input, the first torque input being connected with the first transmission device and the second torque input being connected with the second transmission device, and wherein the first transmission device and second transmission device are each being coupled on an output side with the torque output, wherein the first transmission device and second transmission device each have at least two alternatively selectable transmission gear positions and wherein the transmission gear positions of the first transmission device are independently selectable from the transmission gear positions of the second transmission device.

2. The hybrid drive according to claim 1, wherein the first transmission device has two alternatively selectable transmission gear positions, and wherein a longer-designed transmission gear position of the two alternatively selectable transmission gear positions is configured as a gear of the vehicle that is suitable for maximum speed.

3. The hybrid drive according to claim 1, wherein the hybrid drive has precisely one electric machine generating vehicle propulsion.

4. The hybrid drive according to claim 1, wherein a nominal power of the internal-combustion is equal to or greater than the power demand at maximum speed of the motor vehicle, and a peak power of the electric motor is greater than 80% of the nominal power of the internal-combustion engine.

5. The hybrid drive according to claim 1, wherein the transmission gear positions of the second transmission device are configured such that one of the transmission gear positions is constructed as a driving gear suitable for maximum speed and another of the transmission gear positions is constructed as an efficiency gear.

6. The hybrid drive according to claim 5, wherein the second transmission device has at least three alternatively selectable transmission gear positions, and wherein a further of the the transmission gear positions of the second transmission device is constructed as a starting gear.

7. The hybrid drive according to claim 1, wherein the second transmission device has between two and four alternatively selectable transmission gear positions.

8. The hybrid drive according to claim 7, wherein the first transmission device has two alternatively selectable transmission gear positions, and wherein a longer-designed transmission gear position of the two alternatively selectable transmission gear positions is configured as a gear of the vehicle that is suitable for maximum speed.

9. The hybrid drive according to claim 1, wherein the torque superposition device comprises three shafts comprising a first shaft connected with the first torque input, a second shaft connected with the second torque input, and a third shaft connected with the torque output, and wherein the transmission gear positions are constructed as spur gearwheel sets arranged on respective shafts.

10. The hybrid drive according to claim 9, wherein at least one of a starting gear of the second transmission device and an additional driving gear constructed as an intermediate gear of the second transmission device is represented by way of multiple use of the spur gearwheel sets.

11. The hybrid drive according to claim 1, wherein shifting elements are provided for shifting the transmission gear positions.

12. The hybrid drive according to claim 11, wherein a synchronizing device is assigned to each of the transmission gear position.

13. The hybrid drive according to claim 1, wherein the torque output of the torque superposition device is constructed as an output shaft having an output gear position, the output gear position being directly connected with a differential of a driven vehicle axle of the motor vehicle.

14. The hybrid drive according to claim 13, wherein the torque superposition device comprises three shafts comprising a first shaft connected with the first torque input, a second shaft connected with the second torque input, and a third shaft connected with the torque output, and wherein the transmission gear positions are constructed as spur gearwheel sets arranged on respective shafts.

15. The hybrid drive according to claim 14, wherein at least one of a starting gear of the second transmission device and an additional driving gear constructed as an intermediate gear of the second transmission device is represented by way of multiple use of the spur gearwheel sets.

16. The hybrid drive according to claim 15, wherein the nominal power of the internal-combustion engine is maximally 1.5 times the power demand at maximum speed of the motor vehicle, and a continuous power of the electric motor is greater than 80% of the nominal power of the internal-combustion engine.

\* \* \* \* \*